(12) United States Patent
Moon et al.

(10) Patent No.: US 9,679,354 B2
(45) Date of Patent: *Jun. 13, 2017

(54) DUPLICATE CHECK IMAGE RESOLUTION

(71) Applicant: International Business Machines Corporation, Armonk, NY (US)

(72) Inventors: Rodney G. Moon, Charlotte, NC (US); Gerald C. Rector, Concord, NC (US); Philip Ridgway, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,570

(22) Filed: Jun. 22, 2015

(65) Prior Publication Data
US 2015/0287168 A1 Oct. 8, 2015

Related U.S. Application Data

(63) Continuation of application No. 14/217,703, filed on Mar. 18, 2014, and a continuation of application No. 13/734,202, filed on Jan. 4, 2013, now Pat. No. 9,111,183.

(51) Int. Cl.
*G06K 9/00* (2006.01)
*G06T 3/40* (2006.01)
*G06K 9/78* (2006.01)
*G06T 3/00* (2006.01)
(Continued)

(52) U.S. Cl.
CPC ............ *G06T 3/40* (2013.01); *G06K 9/00442* (2013.01); *G06K 9/46* (2013.01); *G06K 9/6201* (2013.01); *G06K 9/6202* (2013.01); *G06K 9/78* (2013.01); *G06T 3/00* (2013.01); *G06K 2009/4666* (2013.01)

(58) Field of Classification Search
CPC ....... G06K 2009/4666; G06K 9/00442; G06K 9/46; G06K 9/6201; G06K 9/6202; G06K 9/78; G06T 3/00; G06T 3/40
See application file for complete search history.

(56) References Cited

U.S. PATENT DOCUMENTS

| 5,528,740 A | * | 6/1996 | Hill ....................... G06T 3/4023 345/428 |
| 5,579,471 A | | 11/1996 | Barber et al. |
| 5,751,286 A | | 5/1998 | Barber et al. |

(Continued)

*Primary Examiner* — Nirav G Patel
(74) *Attorney, Agent, or Firm* — Reza Sarbakhsh

(57) ABSTRACT

A system and method for comparing digital images, such as checks images used by banks, includes receiving and processing the images to be compared, including scaling the images to a common resolution, as well as filtering them to remove spot noise, background pels, and other non-information carrying elements. One or more regions of each image are selected for comparison. The selected regions are compared to one another by subtracting the pels of one image from the other's pels. A determination is made of whether the two or more images are duplicates of one another, or depict a substantially identical subject, based on the results of the subtractions. Furthermore, the amount of filtering and scaling may be adjusted to enhance the effects of the system to take advantage of common characteristics that may be known or detected in a particular set of images to be compared.

8 Claims, 2 Drawing Sheets

(51) Int. Cl.
 *G06K 9/62* (2006.01)
 *G06K 9/46* (2006.01)

(56) References Cited

U.S. PATENT DOCUMENTS

| | | | |
|---|---|---|---|
| 6,937,774 B1* | 8/2005 | Specht | G06T 3/4061 |
| | | | 348/362 |
| 8,015,162 B2 | 9/2011 | Henzinger | |
| 2001/0035458 A1* | 11/2001 | Schum | G06K 9/3216 |
| | | | 235/462.08 |
| 2006/0039609 A1 | 2/2006 | Takano | |
| 2007/0260137 A1* | 11/2007 | Sato | G06T 5/50 |
| | | | 600/407 |
| 2009/0252434 A1* | 10/2009 | Zhou | G06K 9/38 |
| | | | 382/276 |
| 2011/0029491 A1 | 2/2011 | Joshi et al. | |
| 2013/0148874 A1 | 6/2013 | Jones et al. | |
| 2014/0193063 A1 | 7/2014 | Moon et al. | |
| 2014/0198968 A1 | 7/2014 | Moon et al. | |

\* cited by examiner

DUPLICATE CHECK IMAGE RESOLUTION

FIELD OF THE INVENTION

Embodiments of the invention generally relate to digital image detection, and more particularly, to digital image detection and comparison.

BACKGROUND

Enactment of the Check Clearing for the 21$^{st}$ Century Act ("Check 21") has enabled banks to deploy various digital schemes to process check deposits, including distributed image capture, image exchange, Remote Deposit Capture ("RDC"), and check transaction conversion to other payment types such as Automated Clearing House ("ACH") transfers. In the RDC approach, for example, a banking customer captures an image of each side of a check and transmits them, along with other information typically stored as metadata, to the customer's bank. RDC can be implemented on various technology platforms. Today, it is widely used on smart phones using mobile applications offered by many banks operating in the United States.

In another implementation, a customer inserts a check into a receiving slot at an ATM, wherein the ATM's scanner captures the check as an image, and may further analyze the image using intelligent recognition technology, such as optical character recognition software ("OCR"). The OCR software allows the ATM to ascertain the values of some fields appearing on the check, for example, by recognizing characters and values in the check's E-13B code line, and to store the recognized values as metadata associated with the transaction.

Although intended in part to streamline and automate the check deposit and clearing process, existing digital check processing schemes have increased significantly the need to detect the processing of a single transaction multiple times. For example, where a customer deposits a check using RDC on a smart phone, the customer may deposit the same check at a later time using an ATM. Whether this is done unintentionally or with fraudulent intent, the paying bank and the payee bank both must ensure that a single check is processed as only one transaction, even where there have been multiple deposit attempts of that check.

In a reverse example, where a customer regularly deposits payroll checks bearing substantially the same information, existing automated systems are more likely to arrive at a false positive determination, i.e., identify the distinct checks as duplicates, and mistakenly treat them as one transaction. This is partly because these automated schemes do not monitor or capture every piece of information on a check, since doing so would require significant additional time and computing resources, and would thereby increase transaction costs. Given the volume of transactions in the check processing industry at any given time, these costs can be prohibitive. An unintended consequence of this resource-saving approach, i.e., monitoring less than all of the information available on a check image, is that it leads to two or more distinct check transactions appearing to be duplicates; differences appearing in non-monitored portions of the checks may go unnoticed. In the payroll checks example above, each payroll check may be identical to others deposited by a single customer except for the date field, which typically is not checked at the time of deposit. In light of the substantial potential for problems, the paying bank and the payee bank both must ensure that each distinct transaction is processed, even where the transactions appears to be duplicates.

In both examples, where images of the same check appear to be distinct, and where images of two or more checks appear to be duplicates, there is an increased need for a second level review, in the form of a further automated process, human monitoring, or both. For example, the only currently available automated solution for a second level review is to use OCR technology to find and read fields on a check image (fields that were not found or read in the first level review), and to use this additional information to determine whether two or more check images in question represent the same underlying transaction. Alternatively, or in addition to the automated review, the information may be forwarded to a review operator who must, as a second level reviewer, interrogate the information associated with each transaction suspected of being a duplicate of another transaction. This forwarded information may include check images and their associated metadata. Whether the second level review is automated using character recognition software, or performed by a human reviewer, or both, the per-transaction time and cost of the automated system increase. Additionally, in the case of OCR, the OCR process is not uniform. For example, OCR software evaluates the handwriting portion of a check differently than the check's pre-printed portions. Adding to the difficulty is the lack of uniformity in many of the properties of a check, including often difficult to predict variations, such as character strokes and placement of handwritten text on a check.

The shortcomings of current solutions may lead to a bank refusing to process a check transaction based on an erroneous determination that it is a duplicate transaction; or the bank may process a single transaction multiple times based on a failure to determine that one transaction is a duplicate of another. In either case, customer satisfaction and the reputation of the bank decline. Furthermore, the bank may lose business.

Various factors contribute to the limitations of current automated systems, including differences in checks formats. For example, check size, serialization (or lack thereof), non-standard features (e.g. placement of address block; personalized graphics), differences in handwriting styles or the writing instrument used, illegible handwriting, or handwriting placement (e.g. writing indicating check amount may run outside of designated box), all can make it difficult for an automated process to streamline check image analysis.

Another factor that contributes to the limitations of existing automated systems is differences in the devices used to capture check images and the physical environments in which such devices are deployed. Characteristics of a digitally captured image affected by the particular device that captures and/or stores that image, and the physical environment in which the image is captured, include, without limitation, image type, size, compression, color, resolution, focus, and noise. Factors responsible for these differences in characteristics include, without limitation, differences in device configuration (including software), image processing (e.g. changing exposure, contrast, or other parameters), computing resources, lighting used by a scanner or other capture device, and dust particles on the item to be scanned and on the capture device.

For example, the same check may yield different images when captured using an ATM's scanner compared to a smart phone's camera. Although the images may look substantially similar to the human eye, the pel data that constitute the images are sufficiently different that a strictly pel-by-pel comparison of the two will result in a finding of dissimilarity. Furthermore, other existing comparison methods are not sophisticated enough to accurately and reliably perform more intelligent comparisons with sufficient speed or sufficiently low processing power to make them worthwhile to implement.

A desirable solution to these challenges increases the performance of automated check processing systems by reducing the growing costs associated with reliably comparing the check images that these systems use, and by decreasing the need to for a second level review that uses intelligent character recognition, human monitoring, or both.

SUMMARY

Aspects of the present invention provide a method, system, and program product for duplicate image resolution, i.e. to detect duplicate images, by receiving at least a first and a second image, processing each received image, scaling the processed images to a common resolution, selecting one or more pel regions of the scaled images, subtracting the selected pel region(s) of the first image from the pel region(s) from the second image, and determining based on the results of the subtraction whether the first image and the second image depict substantially identical subjects.

According to another aspect of the invention, a system for comparing images comprises a computer having a processor and a computer-readable storage device, and a program embodied on the storage device for execution by the processor. The program has a plurality of program modules, configured to perform a function, as follows: a receiving module to receive two or more images; a processing module to process the received images, including scaling the processed images to a common resolution; a selecting module to select one or more pel regions in each scaled image for comparison; a subtracting module to subtract the selected pel regions of one image from the selected regions of the other(s); and a determining module to determine whether the received images depict substantially identical subjects, based on the results generated by the subtracting module.

According a further aspect of the invention, a computer program product for comparing images comprises program code embodied on a computer-readable storage medium, the program code being readable and executable by a processor, to perform a method. The method, executed by the processor, comprises receiving two or more images; processing the received images, including scaling them to a common resolution; selecting one or more pel regions from each images, for comparison; subtracting the selected pel region(s) of one image from the selected pel region(s) of the other image(s); and determining whether the received images depict substantially identical subjects, based on the results of the subtraction.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
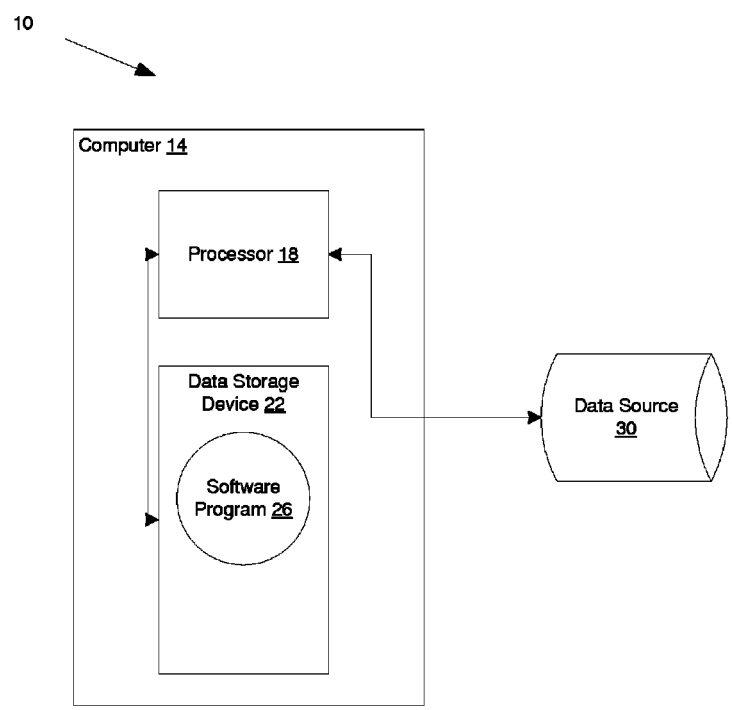
FIG. 1 is a schematic block diagram of an embodiment of a computer system for implementing a method according to an embodiment of the invention.

Referring to FIG. 1, a system 10 according to an embodiment of the invention includes a software program 26, containing code, stored on a data storage device 22 within a computer 14. The system 10 further includes a processor 18 for executing the steps of the program 26. The program 26 may access the data storage device 22 through the processor 18. The system 10 is also operatively connected to a data source 30. The program 26 accesses and interacts with the data source 30 through the processor 18.

The data source 30 may comprise a storage device such as a hard drive, which contains image files, or a capturing device, such as a scanner or camera, which captures images. Alternatively, the data source 30 may perform both of these functions. Other embodiments of the invention may comprise multiple data sources that individually or collectively perform the described functions.

The program 26 receives two or more images from the data source 30, and analyzes the images in relation to one another according to the steps of the program 26, as described below, to determine whether the two images are actual or substantial duplicates. Images are considered duplicates if they contain identical or substantially similar pel information, or if they are otherwise determined to depict substantially identical subjects (for example, two images with different pel information may nevertheless depict the same check). In embodiments of the invention, the amount of similarity required to determine whether two images depict identical or substantially identical subjects can be made adjustable.

Figure 2:
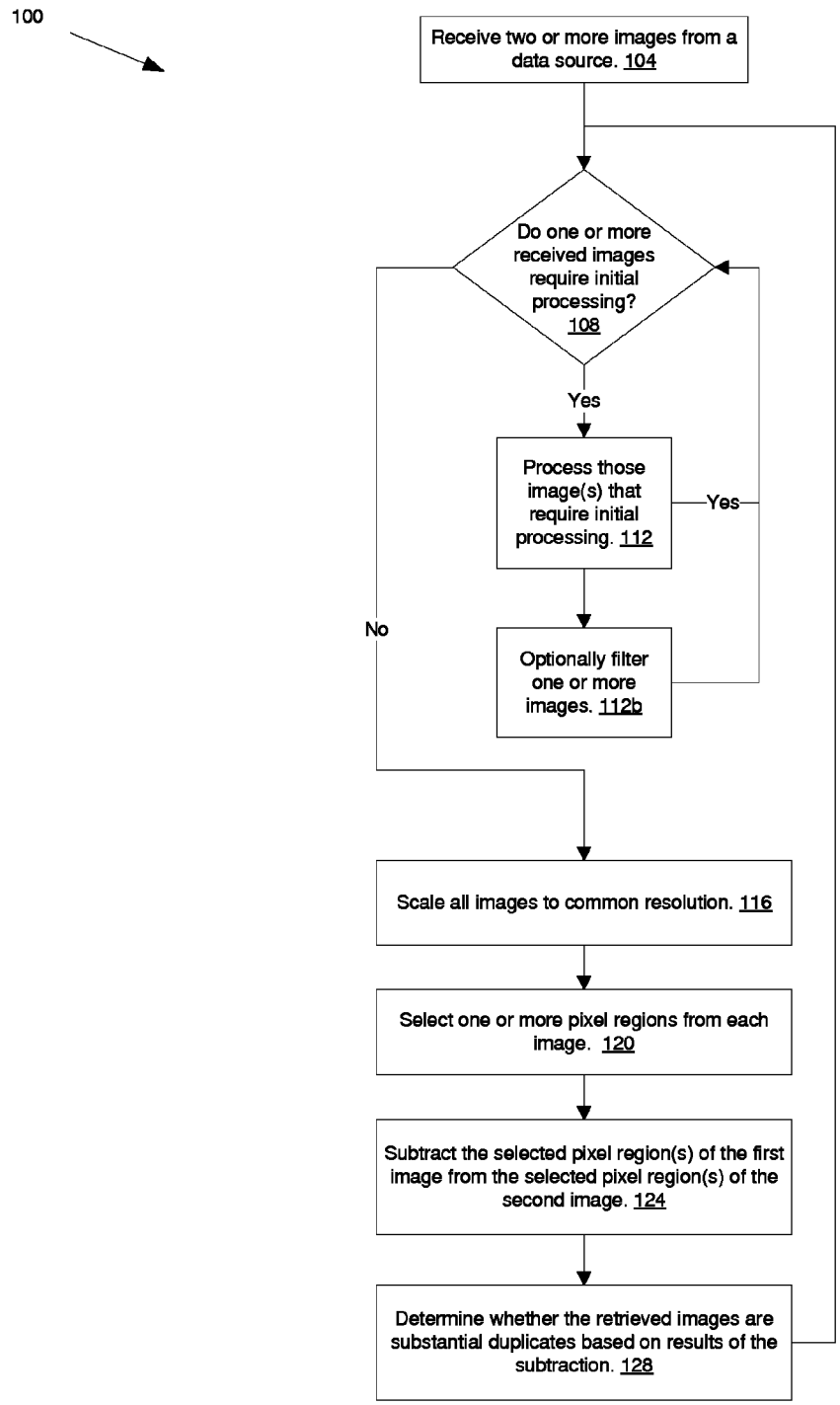
FIG. 2 is a flow chart depicting the steps of identifying duplicate images in accordance with an embodiment of the invention.

Referring to FIG. 2, a method 100, according to an embodiment of the invention, receives two or more images depicting checks from a data source, such as the data source 30 described in connection with the system 10, in step 104. The received images are digital, and are preferably in bitonal color format, compressed with the Group 4 ("G4") FAX standard compression algorithm and packaged in a Tagged Image File Format ("TIFF") wrapper (collectively, the "Preferred Properties").

The data source 30 may be, for example, an ATM scanner or a mobile phone with image capturing, storing, and/or data transmission capabilities, such as a smart-phone with a camera. The data source 30 also may be a database containing images obtained from these and other devices. In addition to receiving the image, step 104 may also retrieve metadata associated with that image. Associated metadata may include, for example, account number, amount, date of deposit, and other information pertaining to the check depicted in the received image. The information contained in the associated metadata is not necessarily derived from the underlying check itself. For example, where a check is deposited into an ATM, the account number and date information may originate from the ATM's computer system, not from scanning and reading the face of a check. In this example, the account number may have been obtained from processing information on a customer's bank card inserted into the ATM.

The images received in step 104 are evaluated in step 108 to determine whether any of them requires processing to facilitate and/or optimize the effects of the image comparison functions of the method 100. Once an image is received, this optimization step may be implemented before or after any of those other functions. Step 108 evaluates image properties including, without limitation, image size, color, format, orientation, and resolution. In step 112, the method 100 processes the images selected for processing in step 108. For example, if properties of the received images vary from the Preferred Properties, the images may be transformed to have those properties. As a further example, the actual resolution of the received images may be different than indicated in their respective file properties. In such a case, the received images would be processed to indicate their correct resolutions.

Additionally, processing of the received images may include, without limitation, organizing, sorting, indexing, or other operations that facilitate and improve the handling of check images.

The method 100 optionally may filter one or more of the received images, in step 112b. Filtering a received image may be accomplished in a variety of ways, including by identifying and removing its background elements or spot noise, i.e. replacing them with blank pels. In the case of a bitonal image, for example, pels identified as background elements or noise spots may be replaced with white pels. More specifically, the filtering step may be implemented using a digital masking process. For example, to remove spot noise, a group of black pels that are surrounded by white pels, and are less than a certain count or shape of black pels, may be identified. One approach is to remove all groups of isolated black pels that contain 2×2 or fewer pels, i.e., 1 or 2 pels wide and 1 or 2 pels tall. Another approach is to remove all groups of black pels with a contiguous black pel count of 6 or fewer.

A similar approach may be used to filter image elements containing characters. This can be accomplished by using edge masks so that the edges of character strokes appearing in a received check image are smoothed, by removing small spurs on the edges of the strokes. This approach transforms the transition areas of the bitonal image while preserving the overall shape of the character strokes. In other words, each image is rendered so that its details are gone but the shapes of the major information carrying characters in the image are preserved.

The filtering process of step 112b as described above may be configured to remove isolated groups of black pels that contain 3×3 or even 4×4 pels. This level of filtering is more aggressive than used in traditional filtering methods, and increases the accuracy of the method's determination of whether two or more received images are duplicates. This added accuracy persists even where the aggressive filtering causes removal of non-noise pels; for example, where the aggressive filtering removes the dot of an "i". In such a case, the extent to which the aggressive filtering may remove foreground elements does not hamper the method's 100 ability to determine whether two or more received images are duplicates.

Steps 108, 112 and 112b may be performed recursively to achieve a desired level of processing, including filtering. For example, to facilitate proper comparison of the received images in other steps of the method 100, each image is rotated as many times as necessary to arrive at a uniform orientation across all images. In the case of bitonal check images, however, typically no more than one iteration of the filtering step is necessary, particularly where the filtering is as aggressive as described above.

In step 116, the received images are scaled to a common resolution in the range of 75-100 pels per inch ("ppi"), and preferably in the range of 75-90 ppi. Scaling down the resolution to lie within these ranges significantly reduces the presence of noise and background elements, but retains substantially the foreground check elements, the latter comprising its most relevant elements in the context of image comparison. These elements include, without limitation, the date, amount, payee and similar information that are better indicators of whether a received check image is a duplicate of another received check image. For example, if a check is deposited once using RDC, and thereafter deposited again using an ATM, the image captured in each of these processes may have a digital noise level that varies significantly from the digital noise level of the other. Furthermore, each image may be captured at a different resolution. This is the case even though the depicted check is the same. According to an embodiment of the invention, reducing each captured image to a common resolution, in the range described, significantly increases the ability of an automated system to disregard the differences between the received images, which are generated as a result of the capturing process, and to focus instead on the information carrying elements of the images in making comparisons.

In a related embodiment of the invention, the amount of filtering in step 112b, and the target common resolution in step 116, or both, are adjustable. This adjustability is particularly useful in circumstances that allow for even more accurate comparisons between two received images, where the images have known, predictable, or discernible common characteristics. For example, a bank that accepts check deposits at branches across the United States may purchase ATMs from different manufacturers. Check deposit images captured by one manufacturer's ATMs likely will have different characteristics compared to those captured by another manufacturer's ATMs. Therefore, the method 100 optionally may detect and analyze the source of a received image, and use information about that source (whether known prior to runtime or gathered after processing multiple images from that source) to determine the optimal filtering, or scaling, of one or more images. Alternatively, or in conjunction with automatic adjustability, the method 100 may allow a user to determine the desired level of filtering or scaling.

In step 120, the method 100 selects one or more pel regions for comparison. The selection may comprise the entire scaled image, or it may comprise smaller regions, such as the serialization field of a check. For example, the method 100 may detect, in the receiving step 104, or the processing steps 108, 112, or 112b, that a large number of received images have substantially similar characteristics. As a further example, the method 100 may be implemented where checks depicted in the received images are known to be substantially similar (e.g. they are drawn on the same bank and therefore have very similar features). In such an example, it may not be necessary to compare every pel in every image. Step 120, therefore, may intelligently select a region of each image to be compared that is smaller than the entire image. In a related embodiment, the selected regions may be configurable by a user. For example, a user may determine that for a check drawn on "Bank A", the best pel region to select is its top right portion. The user may identify the region size and position, and save the information as a "selection profile". The method 100 will then use Bank A's selection profile any time it determines that an image under review depicts a check drawn on Bank A. Application of the selection profile may be automatic or manual. It may further be implemented to apply to a single image or image batches.

In step 124, the method 100 carries out a pel by pel subtraction for the selected region(s), which may comprise the entire image. The smaller the difference, the greater is the likelihood that the compared images are duplicates, i.e. they depict the same underlying subject. Conversely, the greater the difference of the subtraction, the more likely it is that the two images are not duplicates, i.e. they depict different underlying subjects.

In step 128, the method 100 determines, based on the results of steps 120 and 124, whether the compared images depict the same subject, i.e. the same instrument. While the processing function of step 112, and particularly the filtering function of step 112b, as well as the downscaling function of step 116, significantly remove noise and/or background elements of the received checks, they do not remove all such elements. Therefore, it is possible that the processed and downscaled images may still contain variations, i.e. a pel by pel comparison would still identify differences between the two images. This may be the case even where both images in fact depict the same underlying subject.

However, for the method 100 to determine that two images are duplicates or substantial duplicates, it is not necessary that every single pel of the two images be identical. Rather, the determining factor is how the differences in pels are distributed. A concentrated non-random difference between the two images, or between two selected pel regions, is a strong indicator that the two images depict two different underlying subjects. Conversely, where the difference between the two images appears to be random or scattered, it is more likely that the difference is due to noise and/or background elements and not a difference in the information carrying elements. For example, where two checks have identical information in all fields except as for their serialization, the subtraction in step 124 will show a difference concentrated in the region of the check images where the check serialization information is printed. In step 128, the method 100 analyzes such results obtained from step 124 and determines that the subtracted images are not duplicates.

The threshold of pel differences between two compared check images that yield a positive or negative determination of duplicity can be made adjustable, so that the compared images need not be exact duplicates for the system to determine that they depict an identical subject.

Through the above steps, a system employing the method 100 greatly reduces the need for a second level review of suspected duplicate check transactions, by reducing the number of false positives and false negatives. Significantly, the method 100 achieves this result by avoiding the need to use intelligent recognition solutions, which are costly in terms of required time and computing resources.

It should be noted that it is not necessary for the processing steps 108, 112 and 122b, or the scaling step 116, to be performed before or after any other step of the method 100. The method 100 may very well be implemented in embodiments where the image capturing process is reliable and consistent, wherein fewer impurities are introduced into the captured images. In such environments, therefore, it may be desirable to implement the selection step 120, subtraction step 124, and the determining step 128 to compare two or more received images, and to implement the processing steps 108, 112, and 122b and/or the scaling step 116, if the results of the comparison are not sufficiently definite. Furthermore, these steps may be repeated as necessary to suit the particular quality of the images received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for comparing images, comprising:
   receiving a first image and a second image;
   processing the first image and the second image using a program executable by a processor communicating with a computer, the processing of the first and the second image including scaling the first image and the second image to a common spatial resolution, wherein the processing further comprises filtering at least one of the first image and the second image, and, wherein one or both of the first image and the second image are bitonal, having black pels and white pels, and wherein the filtering comprises removing black pels or groups of black pels surrounded by white pels, and the black pels or groups of black pels exist in a square grid having the size 1 by 1 pels to 4 by 4 pels;
   selecting one or more pel regions of the scaled first image and of the scaled second image;
   subtracting the one or more selected pel regions of the scaled first image from the one or more selected pel regions of the scaled second image, respectively; and
   determining whether the first image and the second image depict substantially identical subjects based on the results of the subtraction.

2. The method of claim 1, wherein the processed first image and the processed second image are scaled to a common resolution between 91 and 100 pels per inch.

3. The method of claim 1, wherein the processed first image and the processed second image are scaled to a common resolution between 75 and 90 pels per inch.

4. A system for comparing images, comprising:
   a computer having a processor, and a computer-readable storage device;
   a program embodied on the storage device for execution by the processor, the program having a plurality of program instructions, including instructions for:
   receiving a first image and a second image;
   processing the first image and the second image, wherein the processing includes scaling the first image and the second image to a common spatial resolution, wherein the processing comprises filtering at least one of the first image and the second image, and, wherein one or both of the first image and the second image are bitonal, having black pels and white pels, and wherein the filtering comprises removing black pels or groups of black pels surrounded by white pels, and the black pels or groups of black pels exist in a square grid having the size 1 by 1 pels to 4 by 4 pels;
   selecting one or more pel regions of the scaled first image and of the scaled second image;
   subtracting the one or more selected pel regions of the scaled first image from the one or more selected pel regions of the scaled second image, respectively; and
   determining whether the first image and the second image depict substantially identical subjects based on the results of the subtracting module.

5. The system of claim 4, wherein the instructions for processing comprise instructions to scale the first image and the second image to a common resolution between 75 and 90 pels per inch.

6. A computer program product for comparing images, the computer program product comprising a computer readable non-transitory storage medium having program code embodied therewith, the program code readable/executable by a processor to perform a method, comprising:
   receiving a first image and a second image, by the processor;
   processing the first image and the second image, by the processor, wherein the processing includes scaling the first image and the second image to a common spatial resolution and wherein the processing further comprises filtering at least one of the first image and the second image, and, wherein one or both of the first image and the second image are bitonal, having black pels and white pels, and wherein the filtering comprises removing black pels or groups of black pels surrounded by white pels, and the black pels or groups of black pels exist in a square grid having the size 1 by 1 pels to 4 by 4 pels;

selecting one or more pel regions of the scaled first image and of the scaled second image, by the processor;

subtracting the one or more selected pel regions of the scaled first image from the one or more selected pel regions of the scaled second image, respectively, by the processor; and determining whether the first image and the second image depict substantially identical subjects, by the processor, based on the results of the subtraction.

7. The computer program product of claim 6, wherein the processing comprises:

scaling of the processed first image and of the processed second image, by the processor, to a common resolution between 91 and 100 pels per inch.

8. The computer program product of claim 7, wherein the scaling of the processed first image and of the processed second image, by the processor, is set to a common resolution between 75 and 90 pels per inch.

* * * * *